US010026138B2

(12) United States Patent
Sinclair

(10) Patent No.: US 10,026,138 B2
(45) Date of Patent: Jul. 17, 2018

(54) SCREEN WATERMARKING METHODS AND ARRANGEMENTS

(71) Applicant: Digimarc Corporation, Beaverton, OR (US)

(72) Inventor: Eoin C. Sinclair, Portland, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 15/425,674

(22) Filed: Feb. 6, 2017

(65) Prior Publication Data
US 2017/0213311 A1    Jul. 27, 2017

Related U.S. Application Data

(63) Continuation of application No. 14/522,150, filed on Oct. 23, 2014, now Pat. No. 9,563,927.

(60) Provisional application No. 61/970,233, filed on Mar. 25, 2014, provisional application No. 62/065,462, filed on Oct. 17, 2014.

(51) Int. Cl.
*G06T 1/00* (2006.01)
(52) U.S. Cl.
CPC .... *G06T 1/0064* (2013.01); *G06T 2201/0061* (2013.01)
(58) Field of Classification Search
None
See application file for complete search history.

(56) References Cited

U.S. PATENT DOCUMENTS

| | | |
|---|---|---|
| 6,282,300 B1 | 8/2001 | Bloom |
| 7,006,655 B2 | 2/2006 | Taniguchi |
| 7,007,167 B2 | 2/2006 | Kurahashi |
| 7,319,538 B1 | 1/2008 | Fang |
| 7,372,976 B2 | 5/2008 | Rhoads |
| 7,509,060 B2 | 3/2009 | Yaguchi |
| 7,764,790 B2 | 7/2010 | Ryan |
| 8,570,586 B2 | 10/2013 | Calhoon |
| 2001/0019659 A1 | 9/2001 | Hirai |
| 2006/0262116 A1 | 11/2006 | Moshiri |
| 2008/0292137 A1 | 11/2008 | Rhoads |

(Continued)

FOREIGN PATENT DOCUMENTS

| | | |
|---|---|---|
| WO | WO2013178805 | 12/2013 |
| WO | WO2015148351 | 10/2015 |

OTHER PUBLICATIONS

Jjko Ruanaidh and T Pun, "Rotation, scale and translation invariant spread spectrum digital image watermarking," Signal Processing, vol. 66, 1998, pp. 303-317.

(Continued)

*Primary Examiner* — Matthew Bella
*Assistant Examiner* — Soo Shin
(74) *Attorney, Agent, or Firm* — Digimarc Corporation

(57) ABSTRACT

In an exemplary embodiment, image content is rendered to include a digital watermark pattern at an essentially fixed scale, regardless of the size of screen on which the content is displayed. In one particular embodiment, CSS and JavaScript are responsive to the rendering context (which can include screen size, and/or viewer position) to define the geometry of a watermarked texture block, which is tiled to serve as a background of an HTML-defined page. A great variety of other features and arrangements are also detailed.

17 Claims, 9 Drawing Sheets

(56) References Cited

U.S. PATENT DOCUMENTS

| | | |
|---|---|---|
| 2008/0297853 A1 | 12/2008 | Yang |
| 2009/0204888 A1 | 8/2009 | Miyamoto |
| 2010/0319020 A1 | 12/2010 | Yuen et al. |
| 2011/0029393 A1* | 2/2011 | Apprendi ............ G06Q 30/0277 705/14.73 |
| 2011/0157028 A1 | 6/2011 | Stallings |
| 2011/0196735 A1* | 8/2011 | von Sydow ............ G06Q 30/02 705/14.43 |
| 2011/0212717 A1* | 9/2011 | Rhoads ............. G06F 17/30241 455/420 |
| 2012/0116559 A1 | 5/2012 | Davis |
| 2012/0167133 A1 | 6/2012 | Carroll |
| 2012/0208592 A1* | 8/2012 | Davis .................... H04W 4/001 455/556.1 |
| 2012/0284012 A1* | 11/2012 | Rodriguez ............. G06Q 30/06 704/1 |
| 2013/0185164 A1 | 7/2013 | Pottjegort |
| 2013/0223673 A1 | 8/2013 | Davis et al. |
| 2014/0104137 A1 | 4/2014 | Brown |
| 2014/0281901 A1* | 9/2014 | Mostowy ............ G06F 17/3089 715/234 |
| 2014/0344334 A1* | 11/2014 | Trachtenberg ..... H04N 21/4307 709/203 |

OTHER PUBLICATIONS

PCT International Preliminary Report on Patentability in counterpart application PCT/US2015/021945 (published as WO2015148351), dated Oct. 6, 2016.

* cited by examiner

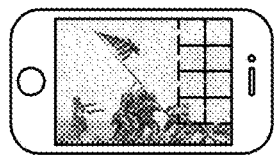
FIG. 1A
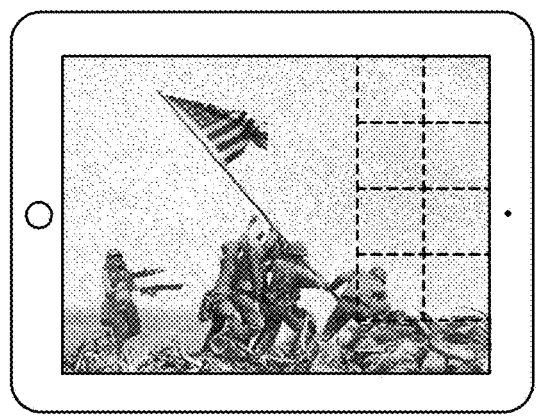
FIG. 1B
FIG. 1C
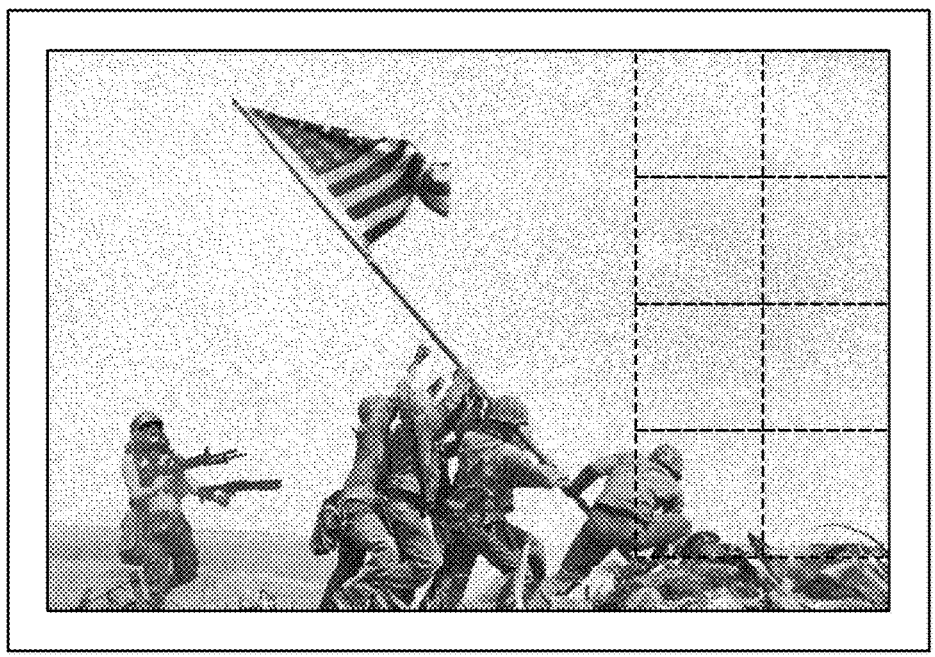
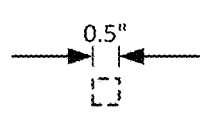
FIG. 2A
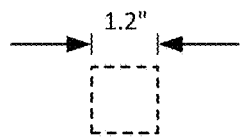
FIG. 2B
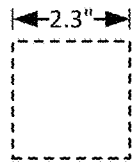
FIG. 2C

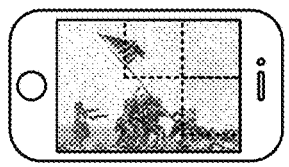
FIG. 3A
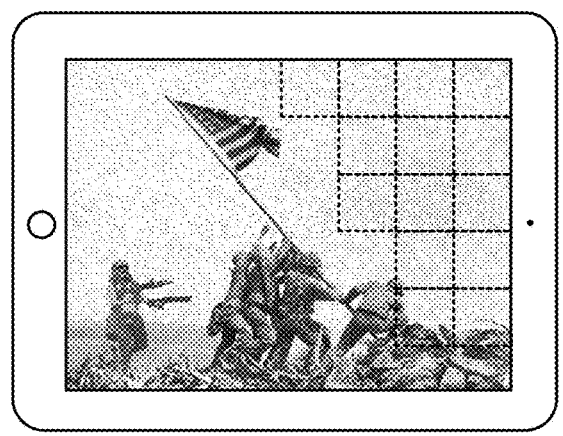
FIG. 3B
FIG. 3C
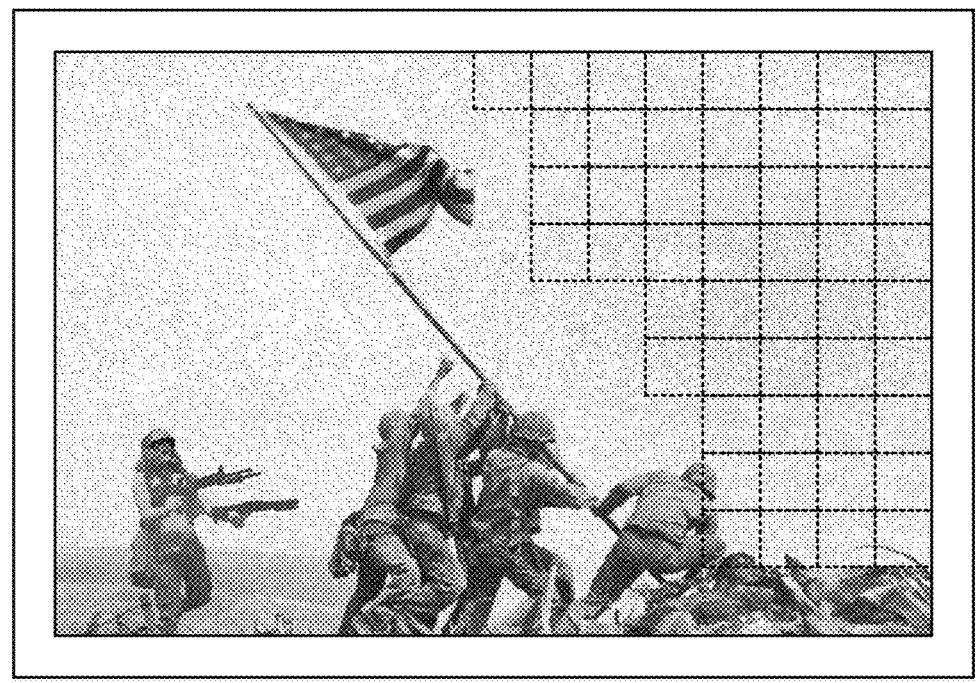
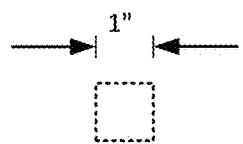
FIG. 4

FIG. 5A
FIG. 5B

```
// CSS for watermark div
#wm1 {
    background:url(/*URL to watermark tile*/);
    background-size:/*Size of watermark tile*/ px;

/*
    Set width and height, and whatever other properties,
    on the div; for watermark readability, width and height
    should not be less than watermark tile width and height.
    */
}
```

FIG. 7A

```
// Javascript method
function redraw() {

// The size in pixels at which to keep the watermark tiles
    var desiredTileWidth = /*Size of watermark tile*/;

// The div containing the watermark tile background
    var wmDiv = document.getElementById("wm1");

// The ratio at which to keep the watermark tiles
    var ratio;
    if (/* The current browser is Internet Explorer */)
            ratio = screen.logicalXDPI / screen.deviceXDPI;
    else
            ratio = window.innerWidth / window.outerWidth;

var size               = desiredTileWidth * ratio;
    var styleString        = size+"px "+size+"px";
    wmDiv.style.backgroundSize = styleString;

```
// HTML which implements the javascript function
    <body onresize="redraw()" onload="redraw()">
    <div id="wm1">
    </div>
    </body>
```

FIG. 7C

100% zoom

90% zoom

110% zoom

```
@media screen and (min-resolution: 0.25dppx) { .digimarcElement {background-size:1300px 1300px;} }
@media screen and (min-resolution: 0.50dppx) { .digimarcElement { background-size:650px 650px; } }
@media screen and (min-resolution: 0.75dppx) { .digimarcElement { background-size:450px 450px; } }
@media screen and (min-resolution: 1.00dppx) { .digimarcElement { background-size:384px 384px; } }
@media screen and (min-resolution: 1.25dppx) { .digimarcElement { background-size:290px 290px; } }
@media screen and (min-resolution: 1.50dppx) { .digimarcElement { background-size:240px 240px; } }
@media screen and (min-resolution: 1.75dppx) { .digimarcElement { background-size:220px 220px; } }
@media screen and (min-resolution: 2.00dppx) { .digimarcElement { background-size:170px 170px; } }
@media screen and (min-resolution: 2.50dppx) { .digimarcElement { background-size:150px 150px; } }
@media screen and (min-resolution: 3.00dppx) { .digimarcElement { background-size:120px 120px; } }
```

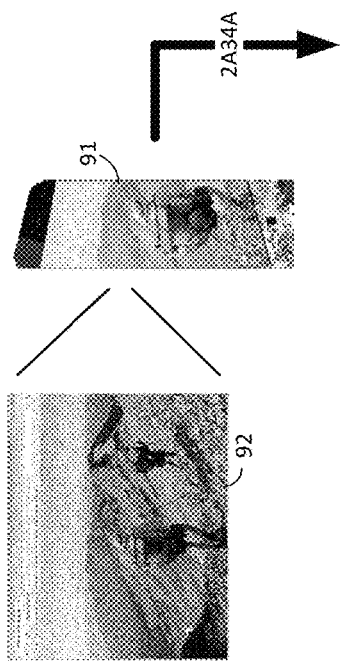

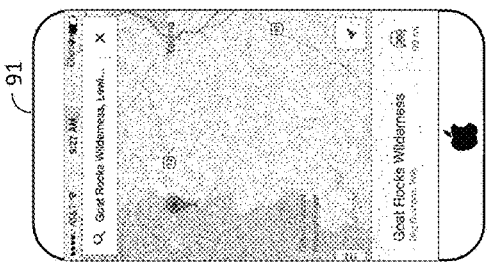

| PAYLOAD | CONTENT FOR PRESENTATION |
|---|---|
| 946CD | http://www.blog.generalmills.com/2014/03/making-nutrition-information-easy-to-find/ |
| 09B79 | https://action.sierraclub.org/site/PageServer#.UyyVSfldX2A |
| F31F7 | http://www.walmart.com/cp/11873187povid=P1171-C3658.2967+1126.4685-L5 |
| 2A34A | https://www.google.com/maps/place/Goat+Rocks+Wilderness/ |
| 7C833 | http://www.bestbuy.com/site/mobile-phones-promotions/the-next-big-thing/pcmcat324900050024 |
| 401EC | http://www.shwoodshop.com/products/eugene-dark-walnut-silver-grey |
| ... | ... |

SCREEN WATERMARKING METHODS AND ARRANGEMENTS

RELATED APPLICATION DATA

This application is a continuation of U.S. application Ser. No. 14/522,150, filed Oct. 23, 2014 (now U.S. Pat. No. 9,563,927), which claims priority to provisional applications 61/970,233, filed Mar. 25, 2014, and 62/065,462, filed Oct. 17, 2014.

INTRODUCTION

Digital watermark technology can facilitate in-person sharing of digital content.

Without digital watermarking, if a first person wants to find and obtain a copy of content displayed on a second person's desktop computer monitor or smartphone display (e.g., a game, a video, or a blog post), there is no straightforward way to do so.

The first person might verbally ask the second person for a URL, and then write it down to access later. But that's slow and error-prone.

Or the first person could ask the second person to send a URL (or the content itself) to an account of the first person, such as by text, email, a social networking account (e.g., Reddit, Digg, Pinterest, etc.), or by a proprietary data exchange technology (e.g., Apple's AirDrop or iCloud, or Google Drive). But that can also be tedious. Moreover, it involves interrupting the second person's activity and launching an associated communication tool on the second person's device.

Digital watermarking can be employed to enable the first person simply to snap an image of the second person's display screen with a smartphone, and obtain a copy of the content by reference to the captured imagery. (Software in the smartphone processes the captured imagery to decode an identifier of the displayed content (e.g., a URL), and then uses the smartphone browser to load the identified content.) The first person obtains a copy quickly, without disrupting the second person.

While such functionality has been possible in a technical sense for many years (e.g., as in patent publication 20100226526), various impediments have made it difficult as a practical matter.

One issue has been the task of encoding the content with the necessary digital watermark information. Each content author needed to take the extra step of adding a watermark to the content.

In accordance with one aspect of the present technology, the task of watermark encoding is not left to the content author. Instead, a watermark (e.g., specifying a URL for the content) is encoded in the displayed content without involvement of the content author.

Another issue has been one of physical scale, due to the differently-sized screens on which content might be displayed.

Imagery captured from a five inch smartphone display will represent an embedded digital watermark pattern at a much smaller scale than the same imagery captured from a 21 inch desktop monitor, posing difficulties to watermark decoding. (Related issues arise when a user re-sizes a display window, or uses a control to zoom-in or -out on displayed content.)

In accordance with another aspect of the technology, the physical scale of a digital watermark in electronic imagery is de-coupled from the physical size of the digital display (or the size of the display window, or the zoom level).

Watermarking is most commonly implemented in the content-creation process. U.S. Pat. No. 6,899,475, however, details an alternate approach—in which watermark encoding is performed in the rendering process (i.e., the process of outputting content to viewable form). In the patented system, a printer executes an interpreter that rasterizes PostScript-defined imagery for printing on paper. The interpreter also generates a pattern corresponding to a desired payload, computes a mask identifying excerpts of the imagery that can be modified without visual artifacts, and modifies the rasterized output to steganographically encode the pattern—processed with the mask—in the printed output. Such arrangement, however, is computationally intense.

Another alternate approach is used in digital cinema. The arrangement is similar to the Postscript printer example, except that the masking data is computed as part of the content creation process, and is then co-conveyed with the MPEG data stream. At the time of rendering, a processor generates a pattern corresponding to a desired payload (e.g., indicating the date, time and place of rendering), weights this pattern with the masking data, and combines it with the MPEG image data for rendering on a projection screen. This arrangement, however, burdens the content creation task.

In accordance with a further aspect of the present technology, watermarking is performed during rendering, but without the complexity of the foregoing techniques.

Cascading Style Sheets (CSS) is a style sheet language familiar to artisans, used for describing the look and formatting of a document written in a markup language. While most often used to style web pages and interfaces written in HTML and XHTML, the language can be applied to any kind of XML document. CSS serves primarily to enable the separation of document content from document presentation, including elements such as the layout, colors, and fonts.

In accordance with still another aspect of the present technology, CSS is employed to include a watermark pattern as part of a document's presentation at the time of rendering. The CSS instructions can define not only the size of the presented watermark pattern (e.g., the size of the component watermark tile), but can also specify the desired watermark tile by payload, or other parameter. This allows documents to be dynamically marked with different watermark patterns (e.g., triggering different actions), based on various factors, such as context.

The foregoing and a great variety of other features and arrangements will be more readily apparent from the following Detailed Description, which proceeds with reference to the accompanying drawings.

BRIEF DESCRIPTION OF THE DRAWINGS

FIGS. 1A, 1B and 1C show an image, watermarked using prior art methods, displayed on three different display devices.

FIGS. 2A, 2B and 2C show the differing scales of component watermark blocks in FIGS. 1A, 1B, and 1C, respectively.

FIGS. 3A, 3B and 3C illustrate an aspect of certain embodiments of the present technology: consistent image watermark block size across different display devices.

FIG. 4 shows that the scale of a component watermark block is substantially consistent across all of FIGS. 3A, 3B and 3C.

FIGS. 5A and 5B illustrate that a translucent watermark image can be added atop other imagery (or that a flat watermark image and other imagery can be blended).

FIG. 7A shows an example of CSS instructions used with one aspect of the present technology.

FIG. 7B shows an example of JavaScript instructions used with one aspect of the present technology.

FIG. 7C shows an example of HTML instructions used with one aspect of the present technology

FIG. 9 shows CSS instructions for use with the Firefox browser.

FIG. 10 illustrates an exemplary lookup table data structure, by which captured image content can be associated with online content.

DETAILED DESCRIPTION

Figure 6A:
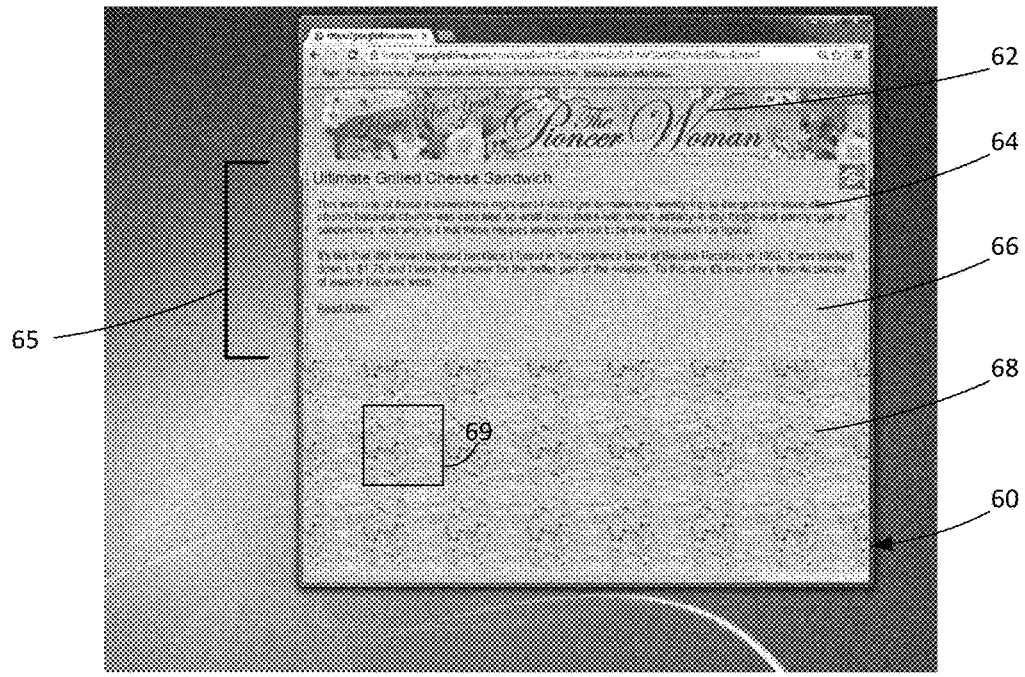
FIGS. 6A and 6B show a web page displayed at zoom levels of 75% and 110%.

Digital watermark technology is widely used in electronic and print media, e.g., to enable a smartphone to link to associated content. For example, a page in a magazine article may be digitally watermarked with a URL of a web site that has further information related to the subject of the article. A user captures an image of the printed page with the smartphone camera, and software extracts the URL and links to the corresponding web page. Such arrangements are detailed, e.g., in patents U.S. Pat. Nos. 6,947,571 and 8,620,021.

In print media, a digital watermark signal typically takes the form of a rectangular block pattern, about an inch on a side, which is repetitively tiled across the printed content. The pattern serves to vary the luminance or chrominance of the underlying print content to a very small degree—too small to be noticeable to a human viewer under normal conditions, but detectable by computer analysis of camera-captured imagery. Each block pattern encodes a data payload of about 50 or 100 binary bits. The tiling of many such identical block patterns across the print media allows the payload to be recovered from camera imagery captured from any location on the page; e.g., an 8×10" printed page may have 80 such watermark blocks across its extent. (Exemplary watermark technology is detailed in U.S. Pat. Nos. 6,590,996 and 8,199,969.)

Watermark detection software, such as on a smartphone, expects the watermark in captured imagery to be of a certain physical scale (e.g., corresponding to a camera-to-page viewing distance of six inches). However, the detector is robust to a range of scale states, e.g., varying between about 50% and 200% of the nominally-expected values. Thus, a print watermark may be read from a distance not just of six inches, but anywhere in a range of three to twelve inches.

The scale of a print watermark is fixed at the time of printing. The physical page size does not later change.

The situation is different for watermarks found in electronic imagery, such as at online web sites and videos. Such electronic imagery may be displayed on a 5 inch smartphone screen, or on a 21 inch desk monitor. Moreover, the user may cause the size of the rendered content to vary, such as by changing the size of a window in which the electronic content is presented, or by zooming-in/zooming-out. These actions can cause extreme variations in the physical scale at which the electronic imagery is displayed, and subsequently captured.

Like print imagery, electronic imagery is typically watermarked using tiled pattern blocks. But the size of each block can vary over a very large range, depending on the just-noted display conditions. While digital watermark detection software is robust across certain scale ranges, it is not suited for the 10:1, or more, variations in scale that may occur with display of electronic content.

This phenomenon is depicted in FIGS. 1A-1C, which show the familiar image of the American flag being raised on Iwo Jima. The image is encoded with a digital watermark, in conventional fashion (illustrated as dashed-line squares across the image, but essentially imperceptible to humans). When the image is shown on a smartphone display (FIG. 1A), it appears at a diagonal scale of about five inches. When the same image is shown on a tablet or desktop display (FIGS. 1B, 1C), it appears at a diagonal scale of about 12 or 21 inches, respectively.

The watermark pattern similarly scales with the image into which it is embedded. Thus, the width of a component watermark tile is about a half-inch in FIG. 1A, versus about 1.2 inches in FIG. 1B, and 2.3 inches in FIG. 1C. These different watermark scales are shown in FIGS. 2A-2C.

A similar scaling effect may occur if a window presenting the image, in the desktop display screen of FIG. 1C, is resized (e.g., by clicking a corner of the window and dragging, as is familiar from graphical user interfaces). Similarly, the rendering software may allow the user to zoom-in or zoom-out on the image, again changing the scale of the embedded watermark pattern.

FIGS. 3A-3C show the same image and watermark, in accordance with an aspect of certain embodiments of the present technology. In the depicted arrangement, the watermark is not encoded into the image data. Rather, it is separate. For example, the rendering software that controls presentation of information on the screen may present the watermark pattern as a translucent overlay, together with presentation of the underlying Iwo Jima image. (Blending of the Iwo Jima image with a watermark image of the same size, in a weighted arrangement—such as by weighted averaging—is another way this operation can be performed.)

Regardless of the size of screen on which the imagery is presented (e.g., smartphone, tablet, or desktop computer), the block size of the watermark pattern is maintained substantially constant. FIG. 4 shows the size of the resulting watermark block; it is essentially unchanged, irrespective of the display size. ("Substantially," as used herein, means within 20% of its original value. "Essentially" means within 10%.)

In the illustrated example, the resulting watermark block is one inch across. (In typical implementations, the watermark block may range from a half inch to two inches in width—or from about 5% to 20% of the longest physical dimension of the display screen, although values outside this range can also be used.) This block size is also maintained substantially constant despite re-sizing of display windows, and zooming.

Such arrangement is further illustrated in FIGS. 5A and 5B. In both, an image of a cat is blended, in weighted arrangement, with a similarly-sized frame of digital watermark pattern. In this case the watermark pattern appears—on human viewing—to be a flat, mid-grey. (There are actually subtle variations that escape human notice in the luminance or chrominance of the grey pixels across each of the component watermark blocks; it is these variations that encode the watermark payload.)

In FIG. 5A, there is a 90/10 weighting between the cat and the grey watermark images. In FIG. 5B, there is a 75/25 weighting between the cat and watermark images. (A 100/0 weighting is not visibly different than FIG. 5A, when rendered in the bitonal form of patent drawings; a 0/100 weighting appears as a flat gray frame.)

While the techniques of blending/overlay with a watermark frame can be used with any web content, other arrangements can also be used. One such alternative is next described, in the context of an online blog entry.

Blogging sites have gained enormous popularity since their introduction in the 1990s. The most popular at the time of this writing is WordPress, which serves here as an exemplary platform. Other popular blogging sites employ similar constructs. WordPress is familiar to those skilled in the art, so its operation is not much belabored.

One of the features that makes WordPress popular is its ease of use. Even those with nil experience in web authoring can put together a WordPress blog. In large part, this is due to its use of "templates" that define standardized structural features of the web presentation. By selecting different templates, a user can quickly re-cast the user's content into different forms, with various layouts, colors, fonts, etc. Collections of such features are termed a WordPress "theme."

To create a blog using WordPress, a user is prompted to pick a theme, and next enter text and pictures. WordPress then automatically authors and publishes a web page, with the user-submitted text and photos presented in a layout defined by the theme.

FIG. 6A shows such a web page 60. This theme includes a user-selected banner artwork 62 at the top of the page, and user-entered text 64 in a blog entry 65. (As is familiar, such a blog site typically presents several blog entries—commonly arranged by date or topic. Only one blog entry 65 is shown in FIG. 6A. If the blog entry is more than a paragraph or two, the page 60 commonly presents just the first part of the blog entry, with a "Read More" link that causes the web browser to load a new web page where the blog entry is presented in unabridged form.)

The remainder of the displayed web page is established by the user-selected theme, i.e., data stored in the corresponding template. This includes the size and font of the type for the user-entered text 64, the rectangular shape of the blog entry 65, the positioning of the blog entry relative to the banner artwork, a first textured pattern 66 that serves as a background for the blog entry (over which the blog text 64 is presented), and a second textured pattern 68 that serves as a background for the web page (over which the blog entries 65 are presented). There is a considerable amount of software instructions (e.g., HTML and the like) in the template that defines all of this layout and structure, but such detail is not typically exposed to the user.

In accordance with another aspect of the present technology, the background pattern(s) in such a web page is digitally watermarked. (Indeed, such a pattern may comprise a pure watermark pattern—with its random-seeming encoding of machine-readable data amplified to a level where it serves as a visible and aesthetically interesting texture pattern. Alternately, the watermark may be applied to a practically flat background, which appears to the user not to carry data, except under close scrutiny.)

In FIG. 6A, the pattern 68 that serves as the background to the web page is watermarked with payload data that causes a smartphone, when it captures an image of such pattern, to link to the blog web page. (One of the component blocks of this second watermark pattern 68 is outlined as item 69 in FIG. 6A.) The pattern 66 that serves as the background to the blog entry is watermarked with payload data that causes a smartphone, when it images such pattern, to link to the expanded blog entry (i.e., the expanded entry that results when the user clicks the "Read More" link at the bottom left of the blog entry 65).

As with the earlier-discussed examples of FIGS. 1A-C, and 5A-B, the physical size of the presented web page 60 of FIG. 6A will vary depending on the size of the display device, the size of the display window, and any zoom parameter with which the web page is viewed.

Figure 6B:
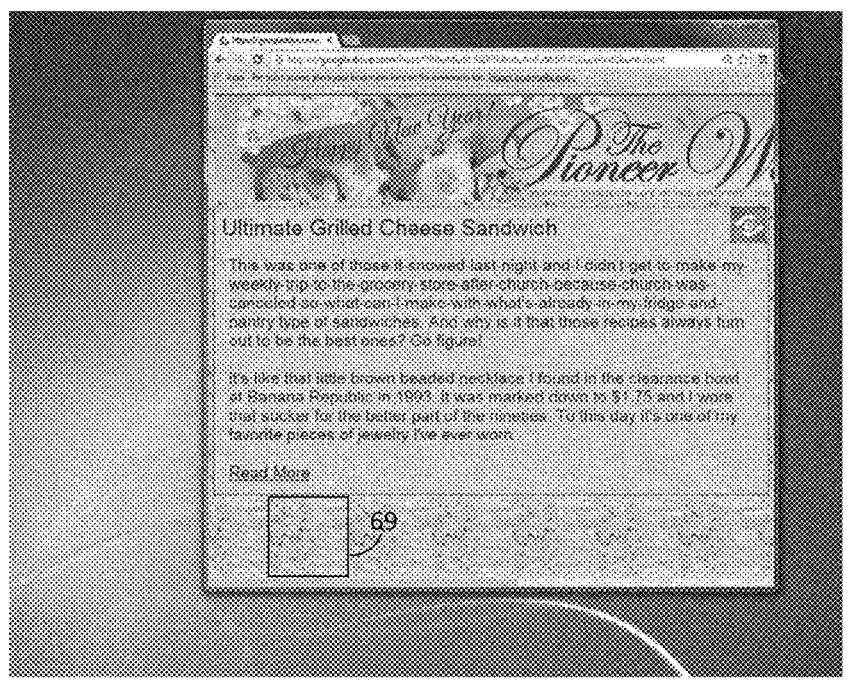

The FIG. 6A web page is displayed at a zoom level of 90%. FIG. 6B shows the same web page, with a zoom level of 125%. Note that the banner artwork 62, the text 64, and the size of the blog entry 66, are all proportionately larger.

But also note that the pattern 68, and the component block 69, are presented at the same scale in both FIGS. 6B and 6A. Although not as evident, the background pattern 66 is also presented at the same scale. These are the watermark patterns, whose scale is maintained substantially constant, despite zoom level, window size, and physical size of the display device.

FIGS. 7A-7C show one way of achieving such behavior, for the Google Chrome and Microsoft Explorer browsers.

FIG. 7A shows an excerpt of the CSS instructions for the web page of FIGS. 6A and 6B. As noted, CSS instructions are commonly used to define the look and formatting of documents authored in a markup language (e.g., XML, HTML).

The particular CSS instructions shown in FIG. 7A define a background watermark pattern, termed wm1. The background is characterized by a URL (which points to a data repository that stores data defining a watermark pattern block), and a size of the component block (in pixels). This URL and size data are inserted between the paired /* and */ markings in the Figure. (While the URL may point to a remote machine, it need not; the block pattern may be stored on the user's machine.)

Similarly, the CSS instructions include parameters for the div where the background watermark will appear.

A div is an HTML construct by which online content can be divided (thus the name) into different parts, e.g., to which different formatting can be applied. In FIG. 6A, the rectangular area of the depicted blog entry 65 is one such div. The watermark information just-noted forms part of this div's definition. FIG. 7A indicates that other parameters of the div, such as its width and height, are also detailed in the CSS instructions (again, inserted between the /* and */markings).

FIG. 7B shows JavaScript instructions defining a function redraw( ). These instructions start by defining variables desiredTileWidth, wmDiv, and ratio.

The first of these, desiredTileWidth, is the size at which the watermark blocks should be maintained, in pixels. (Again, the parameter is inserted between the /* and */.) The second, wmDiv, establishes the specific div that contains the watermark blocks as background. This variable is set equal to the value document.getElementByID("wm1")—a W3C convention for obtaining a reference to an element by its ID.

The third variable, ratio, is a factor by which the watermark block should be changed in size. As will be apparent, here the block size is changed based on the zoom factor (or display size or window size) so as to maintain a substantially fixed block size in all cases. In particular, the JavaScript code of FIG. 7B defines the variable ratio to be a value equal the fraction window.innerWidth divided by window.outerWidth.

Window.innerWidth is the pixel width of the content being displayed within a browser window. If a user zooms-in on the content, a smaller pixel width-portion of the content will be displayed (albeit at a greater size), so this value diminishes. Window.outerWidth, in contrast, is the pixel width of the browser window. This value does not vary with zoom factor.

Figure 8A:
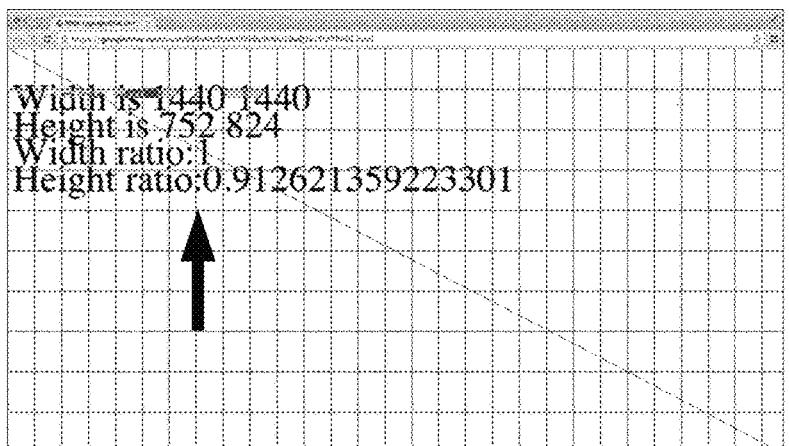
FIGS. 8A, 8B, and 8C show text in a display window, with zoom levels of 100%, 90%, and 110%.
Figure 8B:
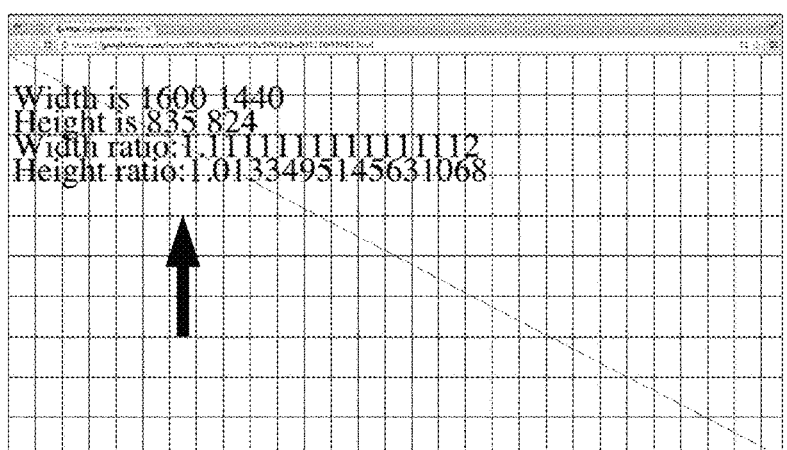
Figure 8C:
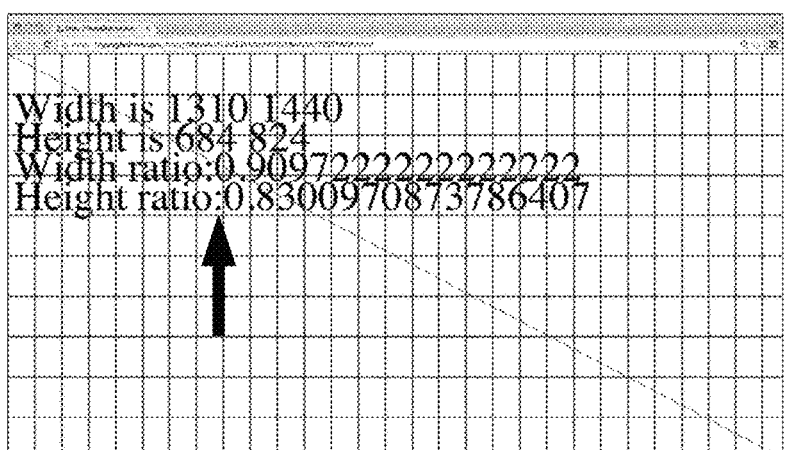

This may be made clearer by reference to FIGS. 8A-8C. All of these figures show an identically-sized window, having a window.outerWidth value of 1440 pixels. Each shows four lines of text as the displayed content. (The arrows are not part of the displayed content; nor are the vertical and horizontal lines that serve as graticule markings.)

The top text line in each window gives two values of "width." The first is the pixel size of the content displayed within the window (i.e., window.innerWidth); the second is the pixel size of the window (i.e., window.outerWidth, or 1440).

In FIG. 8A, the content is displayed at 100% scale. Both of the width parameters are 1440.

In FIG. 8B, the content is zoomed-out, with a zoom value of 90%. As the window is zoomed-out, the size of the content shrinks. Thus, the text shown in FIG. 8B is smaller than in FIG. 8A. (This is illustrated by the overlaid black arrow, which points to the colon in the last line of text; note that it shifted to the left between FIGS. 8A and 8B.) Because the content is physically reduced in size, more of it fits within the depicted window. Thus, the first of the width parameters (in the first line of text)—the pixel width of content displayed within the window—is now 1600, instead of 1440.

FIG. 8C shows the opposite situation, with the content zoomed-in, here at a value of 110%. Reciprocally, the text shown in FIG. 8C is larger than in FIG. 8A. The black arrow (indicating the colon in the last next line) has shifted to the right. Because the content is enlarged in size, less of it fits within the window. Thus, the first of the width parameters (window,innerWidth) is now 1310, instead of 1440.

Each of FIGS. 8A-8C also shows, in the third line of text, the value of the ratio variable referenced in FIG. 7B. For FIG. 8A, it is 1; for FIG. 8B, it is 1.1111; and for FIG. 8C it is 0.9097.

This ratio is the factor by which the size of the watermark block needs to be changed, to counteract changes in size of the displayed content due to zooming. Thus, for example, in FIG. 8B, the displayed text has shrunk in size. To prevent the watermark blocks from shrinking by a similar amount, they must have an original scale of 1.1111 times their nominal size. (The nominal size may be one inch on a side, e.g., 72 pixels on a 72 dpi display, so the adjusted block should have a scale 1.1111 times this value, or 80 pixels.) When the shrinking factor exhibited by the text is likewise applied to such a watermark block, it is presented at its nominal scale, i.e. one inch in width.

Desirably, the re-sized block of pixels that make up a watermark block is an integral number of pixels in width. Due to this quantization to an integer value, there will be some variability in the physical size of the watermark block, at different zoom values. In the example just-given, the block will be 80 pixels on a side for zoom values between 1.1042 and 1.119, leading to blocks that vary from 0.9938" to 1.0062" in width. This is one of the reasons that a "substantially" consistent watermark scale is referenced across different zoom values, instead of an absolutely constant watermark block size.

Returning to FIG. 7B, it will be seen that the variable ratio is defined differently if the JavaScript is running on Microsoft's Internet Explorer (IE) browser. In this case, ratio is defined as the ratio of screen.logicalXDPI to screen.deviceXDPI. This approach is required due to a variant meaning given to window.outerWidth by IE; Microsoft's XDPI properties provide a work-around.

Continuing with FIG. 7B, the JavaScript instructions next define the variable size as the product of the earlier-referenced desiredTileWidth, and the just-discussed ratio. For example, the variable size has a value of 80 in the just-discussed example.

Continuing, the variable styleString is defined as the concatenation of the variable size (i.e., 80) with the text "px" concatenated again with size and the text "px." So in the example just given, this variable styleString has a value "80 px 80 px".

Finally, the last line in FIG. 7B assigns this just-discussed string to wmDiv.style.backgroundSize.

FIG. 7C shows HTML that implements the just-discussed redraw( ) function.

These instructions begin by calling the redraw( ) function whenever an onresize event is detected. (This occurs whenever the browser window is resized.) So whenever the window is resized, the redraw( ) function computes the pixel dimensions of the watermark block, ensuring that it presents at a substantially consistent scale on the display.

Likewise, the FIG. 7C code calls the redraw( ) function on detection of an onload event (i.e., when a web page finishes loading). Thus, when a new web page is displayed, the JavaScript code will be called to establish the correct size of the watermark blocks.

The FIG. 7C code also establishes that these actions are to apply to the div identified by the ID "wm1."

Again, the code of FIGS. 7A-7C is employed in connection with the template used to present the blog page of FIG. 6A. The wm1 div corresponds to the blog entry 65, so this code serves to define and size the watermark blocks of background pattern 66. (Similar code effects similar functionality for the div that spans the body of the blog, including watermark background pattern 68.)

The just-discussed code is exemplary. The same or similar functionality can be implemented in a number of different manners (including, e.g., JQuery, Oracle Java, and Adobe Flash software), so this example code should in no way be regarded as limiting.

By an arrangement like that just-described, a user can select a template that includes associated watermarking instructions, to thereby yield a web page with watermark-based functionality—without any effort or expertise concerning digital watermarking.

(For use with the Firefox browser, the CSS instructions of FIG. 9 are employed. These instructions employ Mozilla's "dppx." This unit represents the number of dots per px unit. Due to the 1:96 fixed ratio of CSS in to CSS px, 1 dppx is equivalent to 96 dpi, which corresponds to the default resolution of images displayed in CSS as defined by image-resolution.)

FIG. 10 gives a basic overview of certain linking aspects of the present technology. A first user with a smartphone 91 captures an image of content 92 presented on a screen of a second user. In this example, the content is imagery of the Goat Rocks Wilderness from the web site of the Pacific Crest Trail Association (PCTA), displayed in a Google Chrome browser window. The code served from the web site, or code in the browser, scales watermark blocks based on the display size (e.g., as discussed in connection with FIGS. 7A-7C). CSS instructions cause the watermark blocks to be overlaid on the PCTA imagery as a translucent "div," as depicted in connection with FIGS. 5A and 5B.

App software in the smartphone 91 processes the captured imagery and extracts the payload encoded by the digital watermark pattern. In the present case, the payload is the hex string 2A34A.

The smartphone wirelessly transmits the payload data, and it is received by a remote server computer 93. The server includes database software, here depicted as a table 94, which associates different watermark payloads with different URLs. The 2A34A watermark payload decoded by the smartphone 91 resolves, through the table, to a URL at Google Maps—detailing the area in the Goat Rocks Wilderness depicted by the captured image. This URL is sent back to the first user's smartphone 91, where that Google Maps content is presented by the browser on the smartphone.

Naturally, the watermark payload can link to any URL (or other code or metadata). In many implementations, the URL will point to the content originally captured by the smartphone camera from the second user's screen, e.g., the photo 92 depicting the Goat Rocks Wilderness.

In some applications, several URLs can be associated with a single payload in the table 94. A menu can then be presented on the smartphone screen detailing the different link choices, any of which the user may choose (e.g., a link to the original image 92, a link to the Google Maps page for the Goat Rocks Wilderness, a link to the Wikipedia page for the Goat Rocks Wilderness, etc.). Alternatively, stored rule data (either at the server 93, or in the smartphone 91) can be applied to automatically select between the available links.

In many implementations, the link returned to the smartphone will be determined in part based on context, such as information about the user. So a retired pensioner in Europe, capturing an image of the Goat Rocks Wilderness from another user's screen, will be routed to a different URL (e.g., the Wikipedia page) than a college student in Yakima, Wash. (who may receive, e.g., driving directions for the 20 mile trip).

Similarly, if a college student in Atlanta navigates to a web site for the Florida Department of Tourism, the web page may be dynamically CSS-marked with a watermark payload corresponding to an advertisement for Spring Break beachfront hotel packages. In contrast, if a 70 year from Atlanta navigates to the same web site, the page may be dynamically marked with a watermark payload leading to promotions for golfing packages.

In some embodiments, the watermark payload extracted from the content 92 may lead to presentation of several items of content on smartphone 91. For example, the original image 92 may be depicted together with a bottom border that contains one or more watermarks that link to auxiliary content on the receiving smartphone, such as the noted map and Wikipedia pages, which the user can then choose between. Alternatively, the border may contain a banner ad for the backpack depicted in the image (e.g., which watermark-links to a corresponding page on the web site of The North Face outfitter).

As is familiar, ad placement on web pages is commonly performed by so-called "Supply Side Platforms"—software tools that discern information about a user who visits a web page (typically through use of cookie data), and determine which ad should fill an ad slot available in the web page delivered for that user's visit. In many instances, the software conducts a quick online auction to identify the vendor willing to pay the most. Such technology is familiar from the Google AdWord service. The AdWord service selects an advertisement for presentation with Google search results, based on the user context (e.g., demographic information and browsing history), and on the user's search query. Related ad serving technology is further detailed in published application 20140164111, and is likewise suited for use with the present technology.

In the arrangements just discussed, the data structure 94 may associate several different items of auxiliary content with a single watermark payload (and, e.g., the server or the smartphone can select between them based on rules and/or context information).

In another arrangement, the watermark blocks presented with content 92 can adapt to context, and convey different payloads. For example, the CSS instructions in FIG. 7A can select among different watermark blocks that should be presented with the content, based on data available to the system on which the content is being presented. To give a simple example, code on the device originally presenting the content 92 can query its operating system to provide the IP address of the device on which the content is presented. Using known techniques, the IP address typically allows the location of the device (e.g., metro Seattle), and the internet service provider (e.g., Comcast), to be identified. The content 92 can be presented with a watermark that is a function not only of the content, but also of the location and the ISP. (Indeed, in some instances, resolution of the watermark using database 94 may identify the location and ISP.) Similarly, any context information discernable by the device can be used in selecting the watermark payload that should be presented. (Again, rule data can naturally be employed.)

Additional information about the retrieving and using links (and other metadata) based on watermark payloads extracted from content, is detailed in patent U.S. Pat. No. 8,364,720.

More on Blogs

WordPress charges a monthly fee to users who want enhanced blogging services. In a previous online marketing paradigm, this cost might have been reduced, or waived, if a user agreed to allow banner ad presentation with their blog. In accordance with another aspect of the present technology, such discount is provided to the user without presentation of banner advertising on the user's blog site. Instead, the blog is marked with a steganographic watermark that conveys a link to advertising material.

In such an arrangement, the hosting service (e.g., WordPress) alerts candidate advertisers to different blog pages, identifying the traffic each is drawing (including cookie data, where available), and keywords about the content displayed on the blog. If one blog page has a blogger's tribute to Jimmy Choo boots, and is found to be drawing a large viewership of 18-30 year old women, this information can be relayed (e.g., using known ad serving arrangements) to candidate advertisers. Nordstrom may offer a nickel for each viewer impression; Zappos Shoes may offer a dime. WordPress sells the rights to Zappos, and serves the blog page with code that causes a watermark to be presented. WordPress enters data in the database 94 causing this watermark to link code that both displays the blog content, and also presents a Zappos promotion for Jimmy Choo boots. Whenever any user captures an image of the blog with their smartphone, the smartphone app loads content from the blog and presents it on the smartphone, together with the Zappos promotion. Each time such a watermark is resolved by the database, Zappos pays WordPress a dime. (Or each time the Zappos promotion is served and displayed by the viewer's smartphone, Zappos pays a dime.)

In another arrangement, watermark-based linking is another enhanced feature for which the blogging service can charge a user. For example, a blogger may post images and travelogue text relating to a recent trip to Italy, but may want to provide a richer content experience than the blogger has time to author. In such case, the blogger may pay a fee, in exchange for which an automated ghostwriter algorithm spices up the blog by defining watermark-based hyperlinks for the user's content. For example, if the blogger posted a picture of a calamari dish enjoyed at a Venice restaurant, the ghostwriter may link such picture to the web site for the restaurant, or its online menu, by data entered in a database 94 in association with the watermark payload for that picture.

Display-Device Pairing

Display devices are becoming ubiquitous, and a great number are found in public spaces. Smartphones and wearables are highly capable computers, but one of their drawbacks is their small display size.

In accordance with another aspect of the technology, a user with a camera-equipped device (and optionally an external keyboard, such as a Bluetooth keyboard) captures an image of a public display screen. The software code that is controlling the screen applies a watermark pattern to whatever information is on the display, using the techniques detailed herein. This watermark pattern resolves, such as through a database 94, into an IP address to which the device can transmit data for display on the screen.

Library carrels at universities, for example, can be equipped with such display devices. A student may sit down and, using a smartphone camera, wirelessly pair the smartphone to the display. With an accessory keyboard the student can have the functionality of a desktop computer, but without the weight, and without fussing with cables. Moreover, the student's information (cookies, etc.) is not shared with the display or its associated processor; only the data needed for display is transmitted from the smartphone device.

Such pairing can alternatively be achieved through other data signaling technologies, including audio (such as an ultrasonic data signal or a low amplitude noise signal encoding the data), barcode, RFID/NFC, etc. Each can convey a payload that resolves—through a database—to an IP address to which display data for that screen device can be sent.

By such arrangements, a small device can easily cast its output to any display screen, increasing the utility of the former, and the use of the latter.

Other Arrangements

A further use of the present technology is for play-out monitoring, e.g., to confirm that correct content is playing on correct public displays at correct times.

Consider an airport, which may have plural electronic advertising signboards positioned along a concourse walkway. A ceiling-mounted surveillance camera with a wide angle lens may capture imagery from one or more of the signs. The location of the camera, and each of the signs, is known.

Rather than watermarking, at the time of content creation, each item of HTML advertising content that is to be displayed on such a screen, and hoping that the encoded watermark scale permits reading from a surveillance camera viewing that screen, the present technology can be employed. That is, the advertising can be created without regard to watermarking, but at the time of rendering, a watermark is applied. And the tile size for the displayed watermark (as well as its payload) can be established based on the screen's location.

Imagery captured by a surveillance camera can be analyzed to determine what content was presented on each sign at different times. Image fingerprinting techniques can be employed to identify the content (with the watermark simply indicating the screen from which the imagery was captured). Alternatively, the watermark selected for inclusion at rendering may serve to uniquely identify the content. (For example, the HTML instructions, or a particular tag therein (e.g., "<TITLE>"), can be hashed to generate an identifier that uniquely identifies that content. This identifier can index a data structure, which identifies a corresponding watermark tile that should be selected for inclusion in the rendered output. When that watermark is later detected, the same data structure can be consulted to determine the content hash, and thereby identify the content.)

The camera-captured imagery can be processed to effect some gross geometric correction (e.g., warping the imagery so that the rectangular screen is presented with approximately its correct aspect ratio, rather than with a perspective-skewed shape), before watermark decoding (and optionally finger-based content identification) is performed.

In some embodiments, each screen and camera is equipped with location-determining technology (e.g., GPS), so that each screen can automatically select an appropriate watermark scale based on a computed distance to the nearest camera (and on its own display dimensions).

Relatedly, the ability of the present technology to present a watermark readable from a particular distance allows beamforming-like applications, with different watermarks targeted to be decodable by viewers at different positions relative to a screen.

A simple example is a Times Square billboard that is programmed to splash different payloads to viewers at different distances—each yielding a different payoff. For viewers near such a sign, on one side of a street, the operator may provide watermark-triggered coupons to stores on that side of the street. For viewers remote from the sign—across the street, the operator may provide coupons to stores on that opposite side of the street.

Moreover, the code of FIGS. 7A-7C can be modified so that the width and height of the watermark tiles are separately modified, unequally. This allows the watermark to be pre-distorted, to compensate for distortion from off-axis viewpoints (i.e., viewpoints off the axis extending perpendicularly from the center of the screen). That is, a tile can be pre-distorted into a non-square shape such that, when viewed from an intended viewer's viewpoint, each tile appears square and of identical size.

A proprietary browser (or WebGL, such as used in Google Maps) can thus render a display in which the watermark tiles target (i.e., are decodable) by differently-located viewers at different times (e.g., each refresh of the screen targets a different viewing location, even if the underlying imagery is static).

(Related technology is detailed in applicant's patent U.S. Pat. No. 8,412,577, which describes how electronic billboards and other public displays can be operated to cyclically present watermarks at different scales, to facilitate detection by camera-equipped smartphones at different viewpoints.)

In some such embodiments, data can be passed to the FIG. 7B (or other) software, detailing parameters such as the viewing distance, optical parameters of a viewing camera (e.g., zoom, angular field of view, sensor dimensions in pixels, etc.), off-axis viewpoint angles (e.g., azimuth and elevation). The watermark tiles added during rendering can then be tailored in accordance with such information.

Another use of the present technology is at retailers of televisions and other screen-based devices. A Best Buy store may have dozens of televisions on display. The manager may periodically move televisions as new ones become available and older ones are discontinued.

Retailers are increasingly using in-store cameras to monitor customer traffic, and dwell times of customers at different locations within a store—generating heat map data to identify which products are getting the most attention. This heat map information is of limited information if it is uncertain what products are presently at positions where customers are dwelling.

Certain embodiments of the present technology overcome this uncertainty. Each television can present a different watermark overlay signal on the demo TV imagery, using the technology detailed herein. The scale of the watermark is tailored, e.g., based on the display size. The traffic analysis cameras (or other cameras) capture imagery including the presented watermarks. Watermarks are decoded from this imagery, and serve to identify the different televisions at different positions in the store (e.g., the 60 inch Samsung UN60H6350 TV is here, the 32 inch Vizio E320AR TV is there, etc.). Customer heat map data can then be related accurately to the products that draw customer attention.

Still more applications arise as wearable computers proliferate. Consider a customer in Best Buy wearing the Google Glass computer, or other such camera-equipped headworn device. Each screen the customer encounters may be overlaid with a different watermark, which is decoded by the wearable computer and stored in association with a time-stamp. (Watermarks decoded from printed signage, product packaging, etc., can be handled similarly.) These decoded watermarks serve as waypoints detailing the customer's path through the store, and dwell time at different points. (In a sense, the log of sensed watermark information serves like a cache of web cookies—detailing a user's visits to particular locations.) The customer may be incented (by coupons or otherwise) to share this log of waypoints with Best Buy. Or a competing retailer may make the customer a better offer to share this same information. (The same arrangement can be practiced with information about sensed audio watermarks or ultrasonic audio, where different watermark payloads/ultrasonic audio are used at different locations in a store.)

Wearable computers (such as Glass) are commonly equipped with position and motion sensors, such as GPS, and 3D-magnetometers, -gyroscopes, and -accelerometer sensors. If the position of an electronic screen is known (e.g., latitude/longitude and compass direction it faces), and the same information is known for the camera of the wearable computer, then also known is the relative geometry, which defines the perspective with which the camera views the screen, and establishes the resulting distortion of the view. The wearable can transmit its position information (e.g., by Bluetooth, shortrange ultrasonic audio, etc.), and the store can use this information in changing the geometric presentation (e.g., the scale and affine pre-distortion) of the watermark on screens within the camera's view. Additionally, or alternatively, the store can similarly transmit a screen's position information, and the wearable can use this information in de-warping imagery captured by the camera so that watermark information can be more easily decoded therefrom.

Still further, a store system with a fixed camera (e.g., on the ceiling) can use image classification techniques to determine whether a shopper depicted in the camera's imagery is or is not wearing a headworn computer. If the shopper is wearing such an apparatus, imagery from the fixed camera can be analyzed to estimate the position and orientation of the headworn computer (substituting for information transmitted from the wearable, in the preceding paragraph). Watermarks in displays within 20 feet of the shopper can then be properly pre-distorted for decoding by the shopper. (The perceptible image can also be pre-distorted in this fashion, yielding something akin to a "forced perspective" display—providing an illusion that the viewer is looking at the screen's presented artwork head-on, instead of from an oblique perspective.)

While the focus of this disclosure has been on screen displays, principles thereof are also applicable to projected displays.

Projected displays are familiar from the Kinect home gaming system, where they are used to perform 3D sensing and gesture detection. Applicant believes they also have utility in retail stores, e.g., where they can project information for reading onto store products and shelves.

The Kinect system is a form of structured light scanner, using a random-looking array of infrared projected dots. In accordance with the present technology, the projected pattern (which may be infrared, or not) encodes payload information. Different payloads can be encoded in different spatial regions of the projected field. Watermark, barcode, or other forms of machine-readable data encoding can be employed.

These payloads can correspond to different products, and the locations to which these payloads are projected may indicate where different products should be shelved. Cheerios cereal should be found in these locations; Wheaties cereal should be found in those locations; etc. Store "planograms" commonly are used to specify what products (typically identified by their respective "SKU"s) should be shelved where. Planogram data can serve as the input from which the project pattern is derived, with each differently-encoded region corresponding to a different SKU.

Figure 11:
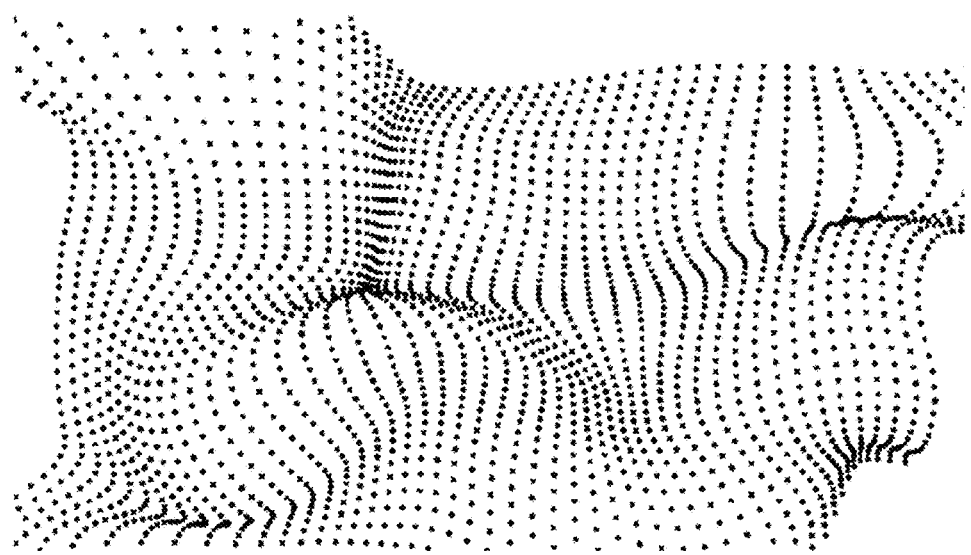
FIG. 11 illustrates how a uniform pattern of dots appears distorted, based on the shape of a surface onto which it is projected.

The projected patterns can be sensed by a smartphone or other camera-equipped device conveyed by a store clerk, and used in stocking the store shelves. While the projector may form part of the camera unit carried by store clerk (with the projected pattern dynamically updated based on sensed location of the device), the projector may more often be fixedly mounted to the store infrastructure, such as mounted on the ceiling or to a shelf. In this case, the pattern may be pre-distorted (i.e., before projection) so that it has an intended, undistorted appearance when viewed from the surface on which it is expected to be projected, using a camera with an expected viewpoint. That viewpoint may be looking horizontally at a store shelf, from the same elevation as the shelf. Or it may be looking at the shelf (up or down, depending on shelf height) from an elevation of 40 inches. Etc. (FIG. 11 shows what happens when a uniform grid of dots is projected onto a surface (in this case curved), and viewed from a different angle—without such pre-distortion. Reversing the role of camera and projector, FIG. 11 may also be viewed as a pre-distorted pattern that—if viewed from the other angle, would appear as a uniform grid of dots.)

In a particular embodiment, different pre-distortions are cyclically applied (e.g., by suitable WebGL browser instructions that have knowledge about the shape and location of the shelving), to permit reading of the projected SKU information from different viewpoints. As planogram information is revised, the projected pattern—derived from the planogram—is similarly revised.

In checking stocked shelves for compliance with a planogram, some implementations do not require the store clerk to judge if a product is out of place. Instead, camera data from which the SKU placement information is discerned can also be applied to an image recognition engine (e.g., based on image fingerprinting and stored reference data) to identify what product is actually found in a given region of a captured image frame. Or the product may be identified by decoding a steganographic digital watermark from its packaging. If the identified product does not match the corresponding projected SKU information, the mis-placed product can be flagged. (E.g., a flashing red rectangle may be overlaid around the depiction of the mis-placed product on the device display, in augmented reality fashion, and/or an audible alert may be sounded to draw the clerk's attention to a shelving error.)

In some embodiments, the task of checking compliance with store planogram information is performed by a camera-equipped robot that traverses store aisles at night. Its computer compiles a hit list of items needing correction, which can later be attended to by a store clerk.

(Additional information about projectors in retail stores is detailed in applicant's published application 20140052555.)

Concluding Remarks

Having described and illustrated the principles of our inventive work with reference to illustrative examples, it will be recognized that the technology is not so limited.

For example, while the detailed embodiments focused on presentation of HTML pages, applicant's inventive work can be applied to any electronic information (including games, videos, text, images, etc.), displayed in any manner.

Moreover, while the detailed embodiments focused on reading watermark information from displayed content using a camera-equipped device, the same principles can likewise be applied to decoding watermarked data directly from the digital content—without any need for image capture.

Certain of the examples given above employed a flat grey watermark pattern. This is suitable for many embodiments. However, in others, it is desirable to adapt the strength (e.g., RMS amplitude) of the watermark signal based on features of the underlying image content, to reduce watermark visibility.

Consider an image that includes grass in the foreground, and sky above. Since the grass imagery is highly random, the randomness introduced by the watermark signal will not be noticed; a very strong watermark can be applied in that area. In contrast, a strong watermark should not be applied to the sky, lest the randomness of the watermark be conspicuous in the normally-flat texture of the sky.

In some embodiments of the technology, the watermark pattern accessed by the URL in FIG. 7A can be tailored based on the image with which it is to be presented, to adapt its strength based on the data hiding capacity of the image. The FIGS. 7A-7C code can be arranged to access a stored spatial mask that defines the strength at which the watermark should be applied at different local regions of the image. Masks of different scales can be obtained, based on the size of the presented content.

Instead of (or in addition to) locally adapting the strength of the watermark to the host imagery, the chrominance of the watermark can be adapted so as to better hide within such content. Again, plural such watermark patterns can be pre-computed, based on different scale factors, and a scale-appropriate one can be selected based on the scale of the associated content.

More information about adaptation of an image watermark based on the underlying host image content is provided in the watermarking references cited herein.

In some implementations, CSS code can fetch plural different watermark blocks—each encoding the same payload, but at different scales. These can be cached in the local device, and switched-between, e.g. as the content is zoomed, or the display window is re-sized.

Although the technology has frequently been described as maintaining a substantially consistent watermark block scale, this is not essential. Since watermark readers are commonly robust over a finite variety of scale states, a relatively few watermark blocks of different scales can enable linking over a large range of display scales. For example, one watermark block scale may be used for zoom values between 20% and 35%; a second for values between 35% and 60%; a third between 60% and 100%; a fourth between 100% and 170%; and a fifth between 170% and 290%.

In some embodiments, the instructions (e.g., of FIGS. 7A-7C) can specify what payload should be encoded in the watermark block. Such a parameter can be passed, e.g., by the CSS instructions to a remote server. The server can then create a watermark block which encodes the specified payload on the fly, and return it (or its URL, etc.) to the calling CSS code (at the requested scale).

As suggested, the watermark payload (or metadata with which it is associated in a data structure) can be of numerous types. Such information can be arbitrary, or identify the user, or user demographic information, or the user's hardware, or the content being viewed, or auxiliary content related to the viewed content, or the date/time, or location (latitude, longitude, elevation), and/or compass orientation of the screen, etc., etc.

Artisans will recognize that different displays have different densities of pixels-per-inch. Early Apple products used 72 ppi (to correspond with the "point" system of typesetters). Recent Retina displays by Apple employ PPIs of between 220 PPI (for the MacBook Pro) up to 326 (for the smallest devices, such as iPhones). A watermark block that is one inch wide, when rendered on an early Apple display, will render at less than a fourth of this size on an iPhone, due to the smaller physical size of pixels in the latter screen. Many devices and software cope with this variability by assuming that the display has 96 pixels per inch, for purposes of compatibility. Interpolation can be used to fill pixels between these 96 PPI locations.

While functions window.innerWidth, window.outerWidth, window.innerHeight, and window.outerHeight, were particularly mentioned, the present technology can use other functions, including document.body.clientWidth and window.screen.availWidth.

Moreover, various hacks can be employed to determine the physical pixel density of the display device (e.g., requesting the user to zoom a reference image of known pixel dimensions until it fills the width of a browser window, and then using the window,innerWidth and window.outerWidth functions to deduce the physical pixel width). Alternately, various smartphone operating systems and software development kits make available methods that can be used to query the current device for the scale at which it displays content, for its width and height in pixels, etc. Still other such functions can be used in objective C, Java, etc. By such arrangements, the scale of watermark blocks can be maintained substantially consistent, across display devices having diverse pixel densities, and across different hardware/software environments.

Principles of the present technology can be applied in situations that make no use of watermarking. For example, a pattern that serves as a background for a web page can be identified by fingerprinting, e.g., using SIFT points. A data structure can again correlate different background patterns to different content, such as URLs and advertising. (The scale of such a pattern can be maintained at a fixed size, irrespective of the scale of the primary content, although this may be less important with fingerprinting.)

The displayed content need not be presented for viewing on an electronic screen. For example, it can be projected onto a passive surface. Similarly, while repeated reference was made to web pages, it will be recognized that such pages needn't be delivered over the internet.

Moreover, principles of this technology can be applied in connection with content rendered in a non-electronic form, such as printed on paper. Constructs analogous to the W3C structures exist for print rendering, e.g., the PostScript page description language, and can be employed in similar fashion. (Applicant's patents U.S. Pat. Nos. 6,899,475 and 7,142,691 also concern watermarking using page description languages.)

While FIG. 10 shows a simple lookup table as the database 94, more elaborate data structures will likely be used in actual practice. This may include federated databases—employing information stored at different locations by different parties.

The artisan will recognize that translucency is supported by the RGBA form of image data, where the "A" channel (alpha) indicates the degree of opacity with which such imagery is to be applied to the display device.

Although reference was made to app software on a smartphone as performing certain of the detailed functionality, it will be recognized that these functions can naturally be performed otherwise—including by operating system software on a smartphone, by smartphone hardware, by a server (e.g., at a social networking service), by another smartphone or computer device, by dedicated hardware, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 6; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers employed in embodiments of the present technology is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, JavaScript, HTML5, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of watermark information from imagery is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud (on a remote server), distributed, etc.

As noted, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200DX, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The artisan is presumed to be familiar with the web authoring constructs employed in the illustrative examples of the present technology, including CSS, JavaScript, HTML5, and other W3C standards.

References were made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds, recognized speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then user or device actions (e.g., writing, talking, reading, searching, navigating, pointing), then proximities (e.g., to people, vehicles, buildings, perimeters, jurisdictions, other devices), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

The techniques of digital watermarking are presumed to be familiar to the artisan. Examples are detailed in documents identified above, as well as in patent documents U.S. Pat. No. 6,614,914, U.S. Pat. No. 6,122,403, 20100150434, 20110274310 and 20140052555. Such watermarks are commonly imperceptible, meaning they are not noticeable to a viewer examining watermarked content under typical viewing conditions (e.g., office lighting, at a distance of 20 inches).

In addition to the documents identified above, applicant's other work that is relevant to the present technology includes that detailed in pending U.S. patent application Ser. No. 14/244,287, filed Apr. 3, 2014 (published as 20150286873), Ser. No. 62/044,736, filed Sep. 2, 2014, and published patents and applications U.S. Pat. No. 8,516,533, 20120218444, 20120046071, 20130311329, 20130314541, 20120284012 and 20140106710.

This specification has discussed several different embodiments. It should be understood that the methods, elements and concepts detailed in connection with one embodiment can be combined with the methods, elements and concepts detailed in connection with other embodiments. While some such arrangements have been particularly described, many have not, due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims all such modifications as may come within the scope and spirit of the following claims and equivalents thereof.

The invention claimed is:

1. A method comprising the acts:
   discerning a presentation scale at which information will be presented to a user on a first display screen, from among plural different presentation scales at which said information may be presented to users on display screens;
   determining a parameter value, based on the discerned presentation scale; and
   after said determining, using said determined parameter value in generating a steganographic watermark pattern that is included with the information presented to the user on said first display screen;
   the method employing a hardware processor in performing at least one of said acts.

2. The method of claim 1 in which the method employs a programmable hardware processor configured by stored instructions, in performing at least one of said acts.

3. The method of claim 1 in which the discerning act includes invoking a web application programming interface function.

4. The method of claim 1 in which the discerning act includes invoking at least one web application programming interface function selected from the list consisting of window.innerWidth, window.outerWidth, window.innerHeight, window.outerHeight, document.body.clientWidth, and window.screen.availWidth.

5. The method of claim 4 in which the discerning act includes at least two web application programming interface functions selected from said list.

6. The method of claim 1 in which the discerning act comprises discerning a change in a zoom or size datum that governs the scale at which the information is presented on the screen, and the method includes, as a consequence of the discerned change, changing an earlier-established value for said parameter of the stenographic watermark pattern to said first value.

7. The method of claim 6 that includes altering the parameter so to as to maintain a consistent scale of the watermark pattern on the screen despite the change in the zoom or size datum.

8. The method of claim 6 in which the watermark pattern comprises a component rectangle pattern, repeated in a tiled array, and the method includes altering the parameter so as to maintain a substantially consistent inch-based width dimension of said component rectangle pattern on the screen despite a change in the zoom or size datum by more than 20%.

9. The method of claim 6 in which the watermark pattern comprises a component rectangle pattern, repeated in a tiled array, and the method includes altering the parameter so as to maintain an essentially consistent inch-based width dimension of said component rectangle pattern on the screen despite a change in the zoom or size datum by more than 20%.

10. The method of claim 6 in which the watermark pattern includes a component rectangle pattern, and said component rectangle pattern overlays a first region of the presented information on the screen prior to said change, and overlays a second, different region of the presented information on the screen after said change.

11. The method of claim 6 that includes discerning a change in a zoom datum that governs presentation of information on the screen.

12. The method of claim 6 that includes discerning a change in a size datum that governs presentation of information on the screen.

13. The method of claim 6 in which:
    the change in zoom or size datum changes a scale of presentation of said information by a first ratio; and
    the altering of the parameter changes a scale of the watermark pattern by a second ratio;
    wherein the second ratio differs from the first ratio.

14. A non-transitory computer readable medium containing instructions for presentation of information on an output medium, the instructions including first instructions defining user content for presentation on the output medium, the instructions further including second instructions causing the output medium to present a stenographic watermark pattern with said user content, said second instructions causing a scale of the presented watermark pattern to adapt based on a scale of the presented user content; wherein:
    when said instructions are used for presenting the information on a first output medium, having a first width dimension, said instructions give rise to a first ratio between a scale of the presented user content and a scale of the presented stenographic watermark pattern; and
    when said instructions are used for presenting the information on a second output medium, having a second width dimension, said instructions give rise to a second ratio between a scale of the presented user content and a scale of the stenographic watermark pattern;
    the second ratio being different than the first ratio.

15. The medium of claim 14 in which the medium contains instructions for presentation of information on an electronic display device as the output medium.

16. The medium of claim 14 in which the medium contains instructions for presentation of information as print on a passive substrate as the output medium.

17. A computer system comprising:
    a source of image data;
    a display screen;
    a processor;
    a memory, the memory containing software instructions configuring the system to discern a presentation scale at which the image data will be presented on the display screen, from among plural different presentation scales at which the image data may be presented on the display screen, and to produce a parameter corresponding to said discerned presentation scale;
    the system further including watermarking means configured to generate, after said parameter has been produced, a tiled stenographic watermark pattern comprising plural blocks, each block having a first width dimension, and to combine said watermark pattern with the image data for presentation on the display screen;

wherein the watermarking means includes sizing means for selecting said first width dimension, from among plural possible width dimensions, dependent on said parameter.

* * * * *

UNITED STATES PATENT AND TRADEMARK OFFICE
CERTIFICATE OF CORRECTION

PATENT NO. : 10,026,138 B2  
APPLICATION NO. : 15/425674  
DATED : July 17, 2018  
INVENTOR(S) : Eoin C. Sinclair Page 1 of 1

It is certified that error appears in the above-identified patent and that said Letters Patent is hereby corrected as shown below:

Column 21, Claim 6, Line 52, delete "stenographic" and insert --steganographic--.

Column 21, Claim 7, Line 55, after "so", delete "to".

Column 22, Claim 14, Line 29, delete "stenographic" and insert --steganographic--.

Column 22, Claim 14, Line 37, delete "stenographic" and insert --steganographic--.

Column 22, Claim 14, Line 43, delete "stenographic" and insert --steganographic--.

Column 22, Claim 17, Line 64, delete "stenographic" and insert --steganographic--.

Signed and Sealed this  
Twenty-fifth Day of September, 2018

Andrei Iancu  
*Director of the United States Patent and Trademark Office*